No. 678,850. Patented July 16, 1901.
W. J. COURTNEY.
RUBBER HOSE.
(Application filed Oct. 23, 1900.)
(No Model.)
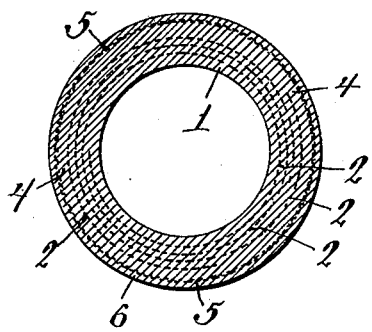
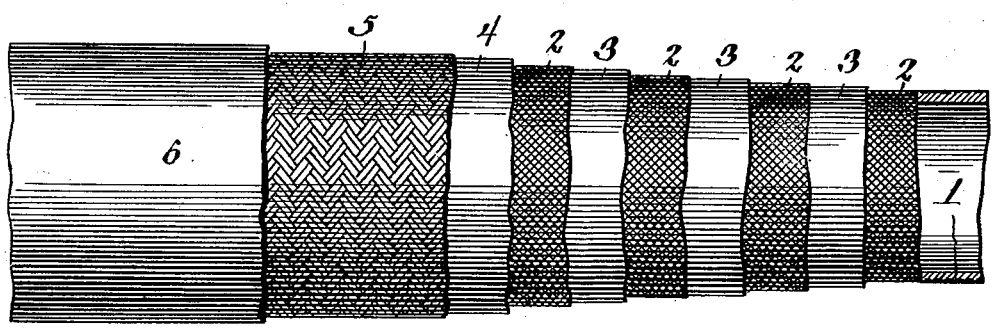
WITNESSES:
D. N. Nayford
Ida M. Shelley
INVENTOR
William J. Courtney
BY
Ernest Hop Pinson
his ATTORNEY.

UNITED STATES PATENT OFFICE.

WILLIAM J. COURTNEY, OF NEW YORK, N. Y., ASSIGNOR TO HERMAN H. WESTINGHOUSE, OF PITTSBURG, PENNSYLVANIA.

RUBBER HOSE.

SPECIFICATION forming part of Letters Patent No. 678,850, dated July 16, 1901.

Application filed October 23, 1900. Serial No. 34,023. (No specimens.)

*To all whom it may concern:*

Be it known that I, WILLIAM J. COURTNEY, a citizen of the United States, residing at No. 265 Central Park, west, in the borough of Manhattan, city, county, and State of New York, have invented a new and useful Improvement in Rubber Hose, of which the following is a specification.

The present invention relates to rubber hose, and especially to hose designed for use for air-brake, steam, or hydraulic purposes, and, in fact, all purposes where a high internal fluid-pressure is sustained.

As is well known to those skilled in the art of hose-making, all kinds of flexible hose are more or less liable to cross-sectional expansion and longitudinal contraction under pressure, the amount of cross-sectional expansion and longitudinal contraction, generally speaking, bearing direct ratio to the internal pressure. In hose designed to be used for air-brake purposes the manner of use entails the subjection of the hose to incessant vibration. Of course all variations in cross-sectional area and length of the hose due to strain incident to alterations in proportions have a deleterious effect, and this is accentuated when, as is the case in air-brake hose, the tubing is charged with a high internal pressure.

I am well aware that many efforts have been made to overcome the tendency of hose to extend and contract under pressure; but I am not aware of any construction which attains the desired result and which can be successfully used for air-brake purposes.

To provide a hose which will not kink when devoid of internal pressure and will not contract longitudinally and expand cross-sectionally under pressure, and which shall at the same time be capable of withstanding the vibrations incident to use as an air-brake hose and be capable of containing a very high internal pressure, is the object of my present invention.

In the drawings I have illustrated a construction embodying my invention, in which—

Figure 1 is a cross-sectional view of a piece of hose; and Fig. 2 is a longitudinal view, partly in side elevation, showing the several layers of reinforcement.

Like numerals of reference refer to like parts throughout both views of the drawings.

Referring to the drawings in detail, 1 designates an inner tube of rubber of the proper quality to confine a fluid under high pressure. Around this tube is wrapped a strip of reinforcing-canvas 2, preferably so as to give a plurality of layers, each layer of canvas being separated by a layer of rubber composition 3. This canvas is applied by taking a strip or strips and joining them up to make a piece of proper length for the tube being manufactured and of width sufficient to envelop the tube 1 several times, placing a layer of rubber on such canvas strip and then longitudinally wrapping the canvas carrying the rubber around the tube 1, so that the edge of the canvas strip is parallel with the axis of the tube. These wrappings may consist of one piece or, as shown in Fig. 1, of two overlapping pieces. Around the outermost layer of canvas is placed a comparatively plastic tube of rubber composition 4, completely enveloping the canvas. When the tube is in this partially-completed condition, it is passed, with the mandrel upon which it is made, through a circular knitting, braiding, or weaving machine, which applies a seamless tube of fabric 5, composed of strong threads, tightly upon the outside of the tube, the inner face of the threads being homogeneous with the rest of the tube by means of the uniting layer of rubber 4, when the completely-formed structure is subsequently vulcanized. The function of this outer seamless tube is to serve as a pliable casing of invariable proportions—that is, a casing which shall be pliable and yet not be subject to alteration of its longitudinal and cross-sectional dimensions under internal pressure and deflation—and I have found in practice that the construction of this casing which best attains the desired result is a two-ply braided fabric having the threads in such intimate close lateral contact as not to permit of the working of the threads one upon and against another and so as substantially to prevent the entrance of rubber between the threads during the vulcanizing process. This construction is used because the two-ply arrangement of the gangs of threads presents a fabric of two layers of threads, the two layers intimately knit together and having comparatively large face areas of thread in intimate frictional contact with each other and at right angles to each other, thus preventing movements of the layers relatively to each other. As before stated, this preferable construction is shown in the drawings, in which I have illustrated a braided seamless casing consisting of pairs of gangs of threads, the threads of each gang being in close lateral contact and each gang being pressed as close together laterally as possible, whereby there is produced a pliable tube invariable in dimensions and capable of withstanding high internal pressure and the disintegrating action of the severe vibration incident to use as air-brake hose.

If desired, a waterproof covering of rubber 6 of suitable thickness may be applied on the outside of the seamless casing.

What is claimed as new is—

1. A rubber hose having as one of its constituent parts located outside the inner tube a seamless braided fabric casing the threads of which are in close, intimate contact with each other and unseparated by intervening rubber whereby the hose is rendered practically non-elastic or non-stretchable both longitudinally and transversely.

2. A rubber hose having an inner tube, one or more longitudinally-laid reinforcing canvas layers surrounding said inner tube, a rubber tube surrounding said reinforcing layer or layers, and surrounding said last-named rubber tube a seamless braided fabric casing the threads of which are in close, intimate contact with each other and unseparated by intervening rubber whereby the hose is rendered practically non-elastic or non-stretchable both longitudinally and transversely.

In testimony whereof I have hereunto set my hand in the presence of two subscribing witnesses.

WILLIAM J. COURTNEY.

Witnesses:
FREDK. HAYNES,
IDA M. SHELLEY.